(12) United States Patent
Lambert et al.

(10) Patent No.: US 11,226,862 B1
(45) Date of Patent: Jan. 18, 2022

(54) SYSTEM AND METHOD FOR BASEBOARD MANAGEMENT CONTROLLER BOOT FIRST RESILIENCY

(71) Applicant: DELL PRODUCTS, LP, Round Rock, TX (US)

(72) Inventors: Timothy M. Lambert, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/011,583

(22) Filed: Sep. 3, 2020

(51) Int. Cl.
*G06F 11/14* (2006.01)
*G06F 11/07* (2006.01)
*G06F 1/30* (2006.01)
*G06F 9/4401* (2018.01)

(52) U.S. Cl.
CPC ............ *G06F 11/1417* (2013.01); *G06F 1/30* (2013.01); *G06F 9/441* (2013.01); *G06F 9/4406* (2013.01); *G06F 11/0706* (2013.01); *G06F 11/076* (2013.01); *G06F 11/0757* (2013.01); *G06F 11/0772* (2013.01)

(58) Field of Classification Search
CPC ............ G06F 11/0757; G06F 11/0754; G06F 11/076; G06F 11/0793; G06F 11/1417; G06F 11/143; G06F 11/1438; G06F 11/1441; G06F 11/22; G06F 11/2215; G06F 11/2221; G06F 11/2235; G06F 11/2284; G06F 9/4401; G06F 9/4403; G06F 9/4406; G06F 9/441; G06F 21/575
See application file for complete search history.

(56) References Cited

U.S. PATENT DOCUMENTS

| 10,037,170 | B2 | 7/2018 | Yang |
| 2012/0173922 | A1* | 7/2012 | Cheng ................. G06F 11/2025 714/13 |
| 2016/0328300 | A1* | 11/2016 | Rahardjo ............ G06F 11/1469 |
| 2017/0123884 | A1* | 5/2017 | Lai ........................... G06F 13/00 |
| 2017/0269943 | A1* | 9/2017 | Kumar ................... G06F 9/4411 |
| 2018/0088962 | A1* | 3/2018 | Balakrishnan ...... G06F 11/1417 |
| 2018/0107558 | A1 | 4/2018 | Rahardjo et al. |
| 2019/0073478 | A1* | 3/2019 | Khessib ................ G06F 21/572 |

(Continued)

FOREIGN PATENT DOCUMENTS

| CN | 1917446 A | * | 2/2007 | ............. H04L 12/24 |
| TW | 201715331 A | * | 5/2017 | ................ G06F 1/24 |

*Primary Examiner* — Gabriel Chu
(74) *Attorney, Agent, or Firm* — Larson Newman, LLP

(57) ABSTRACT

An information handling system includes a processor, a BMC, and a logic device. The BMC boots in response to an AC power cycle event, provides a BMC ready signal in response to the boot, establishes the BMC as a root of trust for the processor in response to providing the BMC ready signal, and provides a processor boot indication to the processor in response to establishing the BMC as the root of trust. The processor boots to an operating system in response to the processor boot indication instead of in response to the AC power cycle. The logic device determines that the BMC failed to provide the BMC ready signal, determines that the BMC failed to boot in response to the AC power cycle and determining that the BMC failed to provide the BMC ready signal, and provides a power-on reset signal to the BMC in response to determining that the BMC failed to boot.

20 Claims, 3 Drawing Sheets

(56) References Cited

U.S. PATENT DOCUMENTS

2019/0163497 A1\* 5/2019 Samuel ................. G06F 9/4411
2019/0220340 A1\* 7/2019 Chou .................. G06F 11/0757
2020/0042710 A1\* 2/2020 Liu .................... G06F 9/44505
2021/0157921 A1\* 5/2021 Brown ................. G06F 9/4401

\* cited by examiner

SYSTEM AND METHOD FOR BASEBOARD MANAGEMENT CONTROLLER BOOT FIRST RESILIENCY

FIELD OF THE DISCLOSURE

This disclosure generally relates to information handling systems, and more particularly relates to providing resiliency of a baseboard management controller (BMC) in an information handling system that employs a BMC boot first policy.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a BMC that boots in response to an AC power cycle event, provides a BMC ready signal in response to the boot, establishes the BMC as a root of trust for the processor in response to providing the BMC ready signal, and provides a processor boot indication in response to establishing the BMC as the root of trust. A processor may boot to an operating system in response to the processor boot indication instead of in response to the AC power cycle. A logic device may determine that the BMC failed to provide the BMC ready signal, determine that the BMC failed to boot in response to the AC power cycle and determining that the BMC failed to provide the BMC ready signal, and provide a power-on reset signal to the BMC in response to determining that the BMC failed to boot

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
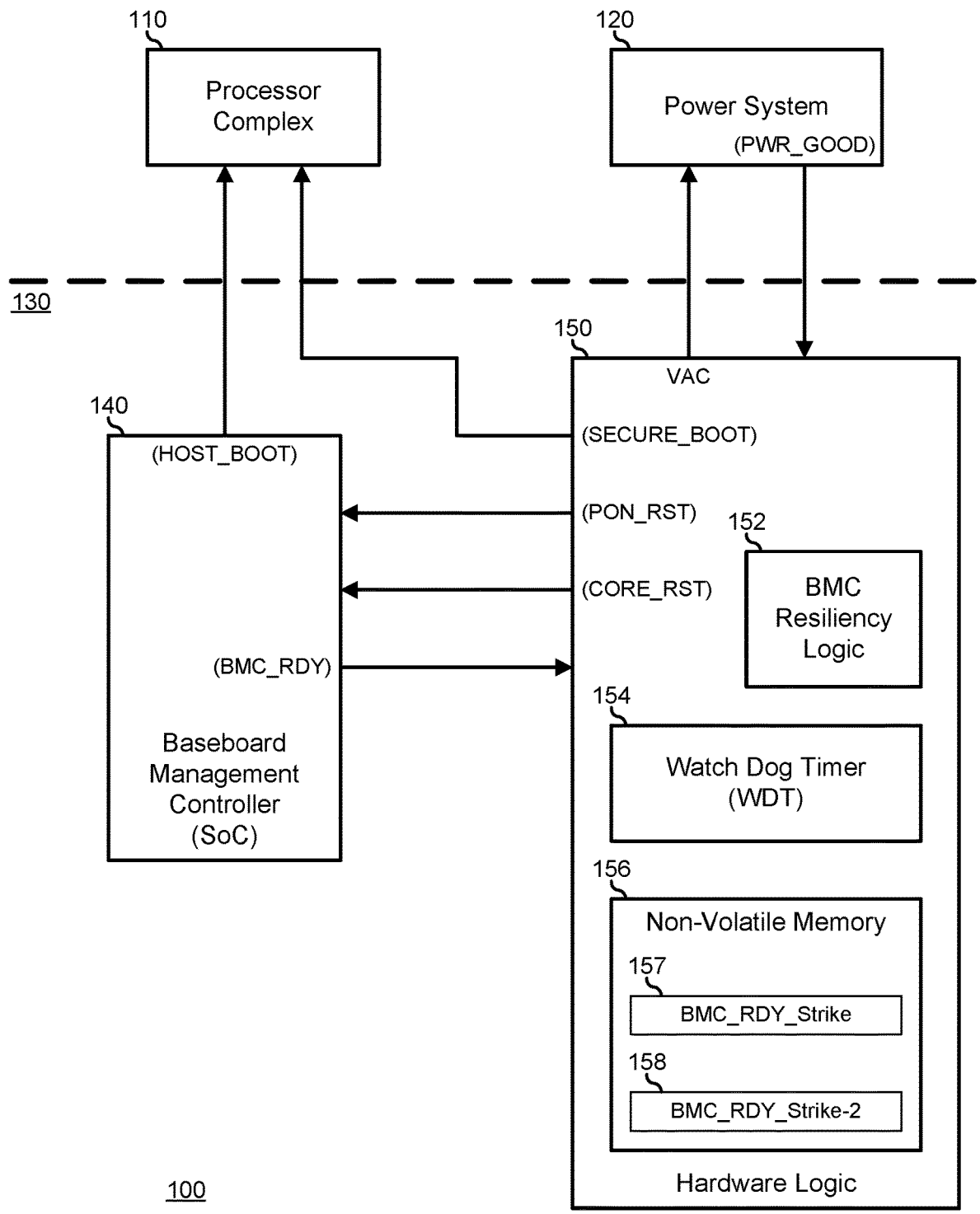
FIG. 1 is a block diagram of an information handling system according to an embodiment of the current disclosure.

FIG. 1 illustrates an information handling system 100 including a host processing complex 110, a power supply 120, and a management environment 130. Host processing complex 110 represents the hardware, firmware, and software that performs the processing tasks normally associated with the operation of a computer system, such as a server in a datacenter or the like. For example, where a server is utilized as a web hosting server, host processing complex 110 will be understood to represent the processors, memory, I/O, and other devices that operate to execute code to instantiate an operating system and to run the web hosting service.

Power supply 120 represents one or more power supply units that operate to provide power to processor complex 110 and management environment 130. Here, each power supply unit may operate to provide various power rails at different times, in accordance with a power state of information handling system 100. In particular, power supply 120 operates to place information handling system 100 into the Advanced Configuration and Power Interface (ACPI) power states, such as the global states (G0—Working, G1—Sleeping, G2—Soft Off, and G3—Mechanical Off), the sleep states (S0—Power On, S1—Standby, S3—Suspend, S5—Powered Off), and the various device states, as needed or desired. It will be understood that at a particular time, other power states may be implemented on information handling system 100, where various power rails are energized, and other power rails are deenergized, or where a particular power rail is energized in one domain, but deenergized in another domain. For example, power supply 120 may operate to provide power to operate elements of management domain 130, but not to provide power to elements of host processing complex 110, as described further, below. Moreover, power supply 120 may include various power supply units that are active power supply units, while other power supply units are inactive and available as back up power supply units, in case one or more active power supply unit suffers a failure. The details of providing power to an information handling system, and the operation under the various global states, sleep states, device states, and other states, are known in the art, and will not be further described herein, except as needed to describe the present embodiments.

Management environment 130 represents a separate processing system of information handling system 100 that operates to monitor, manage, and maintain the elements of the information handling system. When processor complex 110 is operating to perform processing tasks, that is, when power system 120 is providing power to the processor complex, such as in the G0/S0 state, management environment 130 operates to monitor, manage, and maintain elements of information handling system 100 that are not directly related to performing the processing tasks of the processor complex. For example, management system 130 can operate to direct the operations of power system 120 to provide power savings operations or to change operating voltage levels, as needed, to operate cooling fans of the information handling system to ensure the proper operating temperatures are maintained, or to manage other elements of information handling system 100 that are not directly related to the performance of processing tasks by processor complex. Here, management environment 130 may be said to operate out-of-band (OOB) from processor complex 110. That is, management environment 130 operates without utilizing processor cycles of processor complex 110 or otherwise utilizing processing resources of the processor complex.

Further, management environment 130 operates to monitor, manage, and maintain the operations of processor complex 110 in performing the processing tasks. For example, management system 130 can operate to determine workload status, or other status information for the processing tasks. Here, while interacting with the operations of processor complex 110 may not strictly be performed OOB from the processor complex, the interactions with the operations of the processor complex are typically not deemed to be an excessive overhead in terms of processor cycles or the utilization of the processing resources of the processor complex.

Further, when processor complex 130 is not operating to perform processing tasks, that is, when power system 120 is not providing power to the processor complex, such as in the G1, G3, S3, or S5 states, management environment 130 operates to monitor, manage, and maintain the elements of the processor complex in preparation for later activation of the processor complex. For example, management environment 130 may operate to update a system Basic Input/Output System (BIOS) or Universal Extensible Firmware Interface (UEFI), hereinafter refereed to corporately as BIOS, or the operating firmware for the elements of information handling system 100. Here, power system 120 may operate to provide various power domains that permit the electrical operation of various components of processor complex 110 to permit the downloading an installation of code to update the BIOS or operating firmware, but that do not support full scale operation of the components as would be needed for run time operation.

Management environment 130 includes a baseboard management controller (BMC) 140 and a hardware logic device 150. An example of BMC 140 may include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Logic device 150 represents a programmable logic device, such as a Complex Programmable Logic Device (CPLD), a Field Programmable Gate Array (FPGA), or another programmable logic device, as needed or desired. Logic device 150 operates to provide various hardware monitoring and state-based functions for management environment 130. Management environment 130 may further include associated memory devices, logic devices, security devices, or the like, as needed or desired.

In a particular embodiment, information handling system 100 operates to implement a BMC boot-first policy following a real or virtual AC (alternating current) power cycle event. In particular, when information handling system 100 experiences a real of virtual AC power cycle event, management environment 130 operates to boot to a stable state, and then provides in indication to processor complex 110 to initiate the boot of the host operating environment. Here, management environment 130 operates to extend the hardware root of trust that inheres to the management environment to the processor complex. In particular, after management environment 130 is booted, BMC 140 operates 1) to validate the contents of a BIOS non-volatile memory device to ensure that the BIOS has not been tampered with, 2) to provide an inventory of the hardware elements of processor complex 110 and power system 120, including inventories of Open Compute Project (OCP) network interface cards (NICs), power supply units (PSUs), 3) to validate the state of the inventories against trusted configurations, 4) to ensure power state and cooling policy enforcement, 5) to provide a bus speed capping check, 6) to ensure cable identities, 6) to provide COU attestation authentication, 7) to validate memory Serial Presence Detect (SPD) reads, and other security and validation operations for the information handling system prior to booting of processor complex 110, as needed or desired.

It has been understood by the inventors of the current invention that the implementation of a BMC boot-first policy, while strategically beneficial for platform security and tamper resistance, may result in greater complexity in the boot process of the information handling system that implements such a policy. In particular, the resiliency of a BMC to boot problems within a management environment may not be sufficient to reliably permit an information handling system to boot to the host environment. For example, a lockup of a Serial Presence Interface (SPI) during a SPI read may necessitate a virtual AC power cycle event to the management environment, to clear the lockup. Further, an internal Advanced High-Performance Bus (AHB) lockup, or a BMC memory interface lockup may necessitate a Power-On Reset (POR) of the BMC to clear the lockups.

In a particular embodiment, management environment 130 operates to ensure the resiliency of BMC 140 to a wide variety of anomalous conditions that may prevent the successful completion of the BMC boot, prior to permitting the host environment to boot processor complex 110 under a BMC boot-first policy. Here, BMC 140 is illustrated as providing a HOST_BOOT signal to host complex 110, and a BMC_RDY signal to logic device 150, and as receiving a PON-RST signal and a CORE_RST signal from the logic device. The HOST_BOOT signal is given by BMC 140 when the BMC boot-first activities have been successfully completed, and indicates that processor complex 110 is secure to begin its boot process. The BMC_RDY signal is a status indication that BMC 140 has completed its own boot process. Here, the BMC_RDY signal can be asserted at a time after BMC 140 is done booting, but before the BMC begins the BMC boot-first processes. In other words, the BMC_RDY signal indicates that the BMC has booted and is operating normally, but is not associated with the successful completion of, or failure of any of the BMC boot-first processes.

It will be understood that, in practice, BMC 140 may be provided as a System-on-a-Chip (SoC) that includes a processor, such as an ARM processor, and other hardware devices, such as non-volatile memory devices, communication interfaces, and the like. In this regard, the PON_RST signal will be understood to represent a reset signal for the entirety of BMC 140, including all devices included on an SoC that makes up the BMC. In contrast, the CORE_RST signal will be understood to represent a reset to the processor of BMC 140, and not to all of the devices included on the SOC.

Logic device 150 is illustrated as receiving a PWR_GOOD signal from power system 120, and the BMC_RDY signal from BMC 150, and as providing a VAC signal to the power system, a SECURE_BOOT signal to processor complex 110, and the PON_RST and CORE_RST signals to the BMC. The PWR_GOOD signal represents a signal from power system 120 that the power supplies of the power system have been turned on and the voltages on the various power rails are stable. The VAC signal represents a virtual AC (alternating current) reset signal to provide a VAC reset of power system 120. As described herein, the term "virtual alternating current (VAC) reset" refers to operations that includes removing and restoring power to system logic (i.e., Main and AUX components/logic) in order to provide a remote VAC power cycle of all of the components of information handling system 100. A VAC reset is performed without requiring an external smart-switched PSU and without requiring manual AC cord removal and reinsertion by a data center technician. The SECURE_BOOT signal represents a signal to processor complex 110 that BMC 140 has repeatedly failed to successfully boot, and that a limited boot of the processor complex should be performed, for example, for error logging or communication of a problem with the BMC, as will be described more fully below. Logic device 150 includes BMC resiliency logic 152, a watch dog timer (WDT) 154, and a non-volatile memory 156 that stores a BMC_RDY_Strike counter 157, and a BMC_RDY_Strike-2 bit 158. Note that BMC_RDY_Strike counter 157, and BMC_RDY_Strike-2 bit 158 are illustrated as being implemented in non-volatile memory 156. However, the functions and features of BMC_RDY_Strike counter 157, and BMC_RDY_Strike-2 bit 158 may be implemented in any way that ensures the operation as described below. For example, an external latch that retains state when the power to management environment 130 may be utilized for one or more of BMC_RDY_Strike counter 157, and BMC_RDY_Strike-2 bit 158, as needed or desired. The functions and features of logic device 150 in ensuring the resiliency of BMC 140 and the BMC boot-first process will be described with reference to FIG. 2, below.

Figure 2:
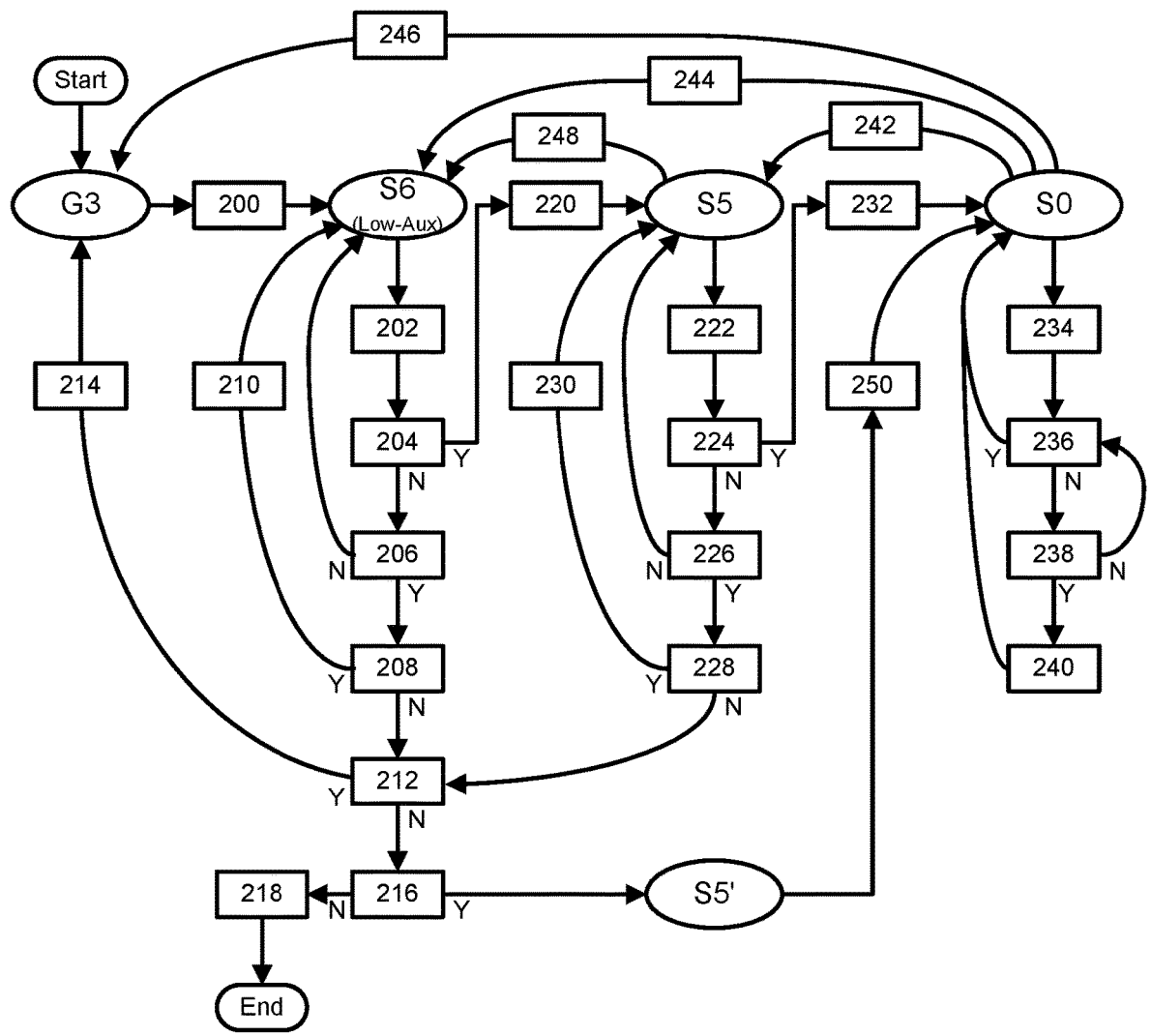
FIG. 2 is a state diagram including a method for ensuring the resiliency of a BMC and a BMC boot-first process according to an embodiment of the current disclosure.

FIG. 2 is a state diagram including a method for ensuring the resiliency of BMC 140 and the BMC boot-first process. The method starts with information handling system 100 in the G3 (Mechanical Off) state. In block 200, a BMC boot process is initiated, and the processing of a logic device is initiated. If the BMC_RDY_Strike-2 bit is set, indicating that the BMC has failed to boot twice, then the BMC_RDY_Strike counter is set to 10b. Otherwise the BMC_RDY_Strike counter is set to 00b. Then the information handling system is set to a S6 state. The S6 state is a custom sleep state that provides various auxiliary power rails to support the BMC boot-first processes, such as the validation of the contents of a BIOS ROM, the inventory status, and the like. Pseudocode for the steps of block 200 is provided as:
   BMC Boot
   CPLD Boot
   If: BMC_RDY_Strike-2=1
      Then:
         BMC_RDY_Strike=10b
         Clear: BMC_RDY_Strike-2
      Else:
         BMC_RDY_Strike=00b In block 202 a BMC_HOLD_IN_S5 bit is set, indicating that the information handling system is expected to move out of the S5 (Host Off) state, and into the S0 (Host On) state, provided the results of block 204 permit, as described below. If the POWER_GOOD signal is not asserted and the BMC_RDY signal is not asserted, then the watch dog timer (WDT) is armed, otherwise the WDT is disarmed, and the method proceeds to block 204. Pseudocode for block 202 is provided as:
   BMC_HOLD_IN_S5=True
   If: (POWER_GOOD=0 & BMC_RDY=0)
      Then:
         Arm: WDT
      Else:
         Disarm: WDT In block 204, a decision is made as to whether or not the BMC_RDY is equal to 1, indicating that the BMC has successfully booted. If so, the method proceeds to block 220, as described below. If not, the method proceeds to block 206. Pseudocode for block 204 is provided as:
   Is: BMC_RDY=1?

In block 206, a decision is made as to whether or not the WDT has timed out, indicating that the BMC has failed to boot for too long a duration. If not, the method returns to the S6 state. If so, the method proceeds to block 208. Pseudocode for block 206 is provided as:
   Is: WDT=Timeout?

In block 208, after the WDT has timed out, the BMC_RDY_Strike counter is incremented by 1 and a decision is made as to whether or not the BMC_RDY_Strike counter is equal to 01b, indicating that the failure by the BMC to boot was a first failure. If not, the method proceeds to block 212, as described below. If so, the method proceeds to block 210. Pseudocode for block 208 is provided as:
   Set: BMC_RDY_Strike+1
   Is: BMC_RDY_Strike=01b?

In block 210, the logic device issues the PON_RST signal to the BMC to reset the SoC, and the method returns to the S6 power state. Pseudocode for block 210 is provided as:
   Issue: PON_RST In block 212 a decision is made as to whether or not the BMC_RDY_Strike counter is equal to 10b, indicating that the failure by the BMC to boot was a second failure. If not, the method proceeds to block 216, as described below. If so, the method proceeds to block 214. Pseudocode for block 212 is provided as:
   Is: BMC_RDY_Strike=10b?

In block 214 the BMC_RDY_Strike-2 bit is set to 1, to latch the fact that the failure by the BMC to boot was the second failure, such that the information is retained during a power cycle event, and the logic device asserts the VAC signal to the power system to perform a virtual AC power cycle event, and the information handling system enters the G3 (mechanical off) state. Pseudocode for block 214 is provided as:
   Set: BMC_RDY_Strike-2=1
   Issue: V_AC Cycle In block 216, because the BMC_RDY_Strike counter did not equal 01b (from block 208 above), nor did the BMC_RDY_Strike counter equal 10b (from block 212 above), the BMC_RDY_Stike counter is understood to equal 11b, indicating that the failure by the BMC to boot was a third failure. A decision is made as to whether or not the logic device is a default logic device. If so, the information handling system enters a special S5' state, as described below. If not, the logic device is understood to be a custom C logic device for extreme security environments, and the method proceeds to block 218. Pseudocode for block 216 is provided as:

Result: BMC_RDY_Strike=11 b
Is: Default CPLD?

In block 218, when the logic device is a custom C logic device for extreme security environments, the information handling system remains in S6 until a real AC power cycle event occurs and the method end. Pseudocode for block 218 is provided as:

Remain In S6 Until Real AC

When the BMC_RDY bit is equal to 1 in block 204, and the method proceeds to block 220, the BMC boot-first services are performed, and BMC_RDY_Strike counter is set to 00b, and the information handling system enters the S5 (Powered Off) state. Pseudocode for block 220 is provided as:

BMC Boot First Services
Set: BMC_RDY_Strike=00b

From the S5 (Powered Off) state, in block 222 the BMC_HOLD_IN_S5 bit is set, indicating that the information handling system is expected to move out of the S5 (Host Off) state, and into the S0 (Host On) state, provided the results of block 224 permit, as described below. If the POWER_GOOD signal is not asserted and the BMC_RDY signal is not asserted, then the watch dog timer (WDT) is armed, otherwise the WDT is disarmed, and the method proceeds to block 224. Pseudocode for block 222 is provided as:

BMC_HOLD_IN_S5=True
If: (POWER_GOOD=0 & BMC_RDY=0)
  Then:
    Arm: WDT
  Else:
    Disarm: WDT In block 224, a decision is made as to whether or not the BMC_RDY bit is equal to 1, indicating that the BMC has successfully booted. If so, the method proceeds to block 232, as described below. If not, the method proceeds to block 226. Pseudocode for block 224 is provided as:

Is: BMC_RDY=1?

In block 226, a decision is made as to whether or not the WDT has timed out, indicating that the BMC has failed to boot for too long a duration. If not, the method returns to the S5 state. If so, the method proceeds to block 208. Pseudocode for block 206 is provided as:

Is: WDT=Timeout?

In block 228, after the WDT has timed out, the BMC_RDY_Strike counter is incremented by 1 and a decision is made as to whether or not the BMC_RDY_Strike counter is equal to 01b, indicating that the failure by the BMC to boot was a first failure. If not, the method proceeds to block 212, as described above. If so, the method proceeds to block 230. Pseudocode for block 228 is provided as:

Set: BMC_RDY_Strike+1
Is: BMC_RDY_Strike=01b?

In block 230, the logic device issues the PON_RST signal to the BMC to reset the SoC, and the method returns to the S5 (Powered Off) state. Pseudocode for block 230 is provided as:

Issue: PON_RST

When the BMC_RDY bit is equal to 1 in block 224, and the method proceeds to block 232, the BMC boot-first services are performed, the BMC_RDY_Strike counter is set to 00b, the PWR_ON_REQ is granted, and the information handling system enters the S0 (Powered On) state. Pseudocode for block 232 is provided as:

BMC Boot First Services
Set: BMC_RDY_Strike=00b
PWR_ON_REQ Granted (Boot Host)

When the information handling system is in the S0 (Powered On) state, then either the BMC has successfully performed the boot-first services (having come through block 232 as described above), or the BMC has repeatedly failed to successfully boot (having come out of the S5' state through block 248 as described below). In either case, in the S0 (Powered On) state, the operations of the BMC are monitored, and a hung BMC may be able to be fixed by issuing the CORE_RST signal as described below with respect to blocks 234-240.

In block 234, the WDT is armed. Pseudocode for block 236 is provided as:

Arm: WDT

In block 236, a decision is made as to whether the BMC_RDY signal is asserted, indicating that the BMC is running. If so, the method returns the S0 (Powered On) state. If not, the method proceeds to block 238. Pseudocode for block 238 is provided as:

Is: BMC_RDY=1?

In block 238, a decision is made as to whether or not the WDT has timed out. If not, the method returns to block 236. If so, the method proceeds to block 240. Pseudocode for block 240 is provided as:

Is: WDT=Timeout?

In block 240, the CORE_RST signal is asserted to reboot the BMC processor, and the method returns to the S0 (Powered On) state. Pseudocode for block 242 is provided as:

Issue: CORE_RST

When the information handling system is in the S0 (Powered On) state, the information handling system may enter the various off states (S5, S6, and G3) as described below with respect to blocks 242, 244, and 246.

In block 242, the PWR_ON_REQ is deasserted and the information handling system returns to the S5 (Powered Off) state. Pseudocode for block 244 is provided as:

PWR_ON_REQ=False?

In block 244, when the information handling system experiences a power fault, or a PSU firmware update is performed, or the information handling system experiences a short AC power loss, the information handling system returns to the S6 state. Pseudocode for block 246 is provided as:

Pfault?
PSU FW Update?
Short AC Loss?

In block 246, the information handling system receives a virtual AC power cycle request (VAC), or a real AC power cycle occurs, and the information handling system returns to the G3 (Mechanical Off) state. Pseudocode for block 246 is provided as:

VAC=True?
Real_AC=True?

When the information handling system is in the S5 (Powered Off) state, then, in block 248, when the information handling system experiences a power fault, or a PSU firmware update is performed, or the information handling system experiences a short AC power loss, the information handling system returns to the S6 state. Pseudocode for block 248 is provided as:
  Pfault?
  PSU FW Update?
  Short AC Loss?

Finally, when the information handling system is in the special S5' state, having unsuccessfully booted the BMC three or more times, and the logic device is determined to be a default logic device in block 215, then the information handling system enters a special mode for entering the S0 (Powered On) state. Here, in block 250, the WDT is disarmed, and the logic device turns on a first healthy PSU, sets the BMC_RDY_Strike counter to 00b, disables OCP NICs and auxiliary fans, asserts the SECURE_BOOT signal to the processor complex, and issues a PWR_ON_REQ to boot the information handling system. Here, the assertion of the SECURE_BOOT signal indicates that the root of trust from the BMC is not established, and so the boot process for the information handling system is limited to enabling sufficient resources to log the system failure and provide an indication, such as via a VGA screen, that the information handling system is not secure. It will be understood that the SECURE_BOOT signal may be provided by the logic device as a discrete signal, as shown and described above, or may be provided based upon communicating of the status of the management environment by, for example, making the BMC_RDY_Strike counter or the BMC_RDY_Strike-2 bit available for reading by the processor complex. Pseudocode for block 234 is provided as:
  Disarm: WDT
  CPLD:
    $1^{st}$ Healthy PSU Main=ON
    BMC_RDY_Strike=00b
    No OCP/AUX Fan enable
    SECURE_BOOT=True
    PWR_ON_REQ Granted (Boot Host)

Figure 3:
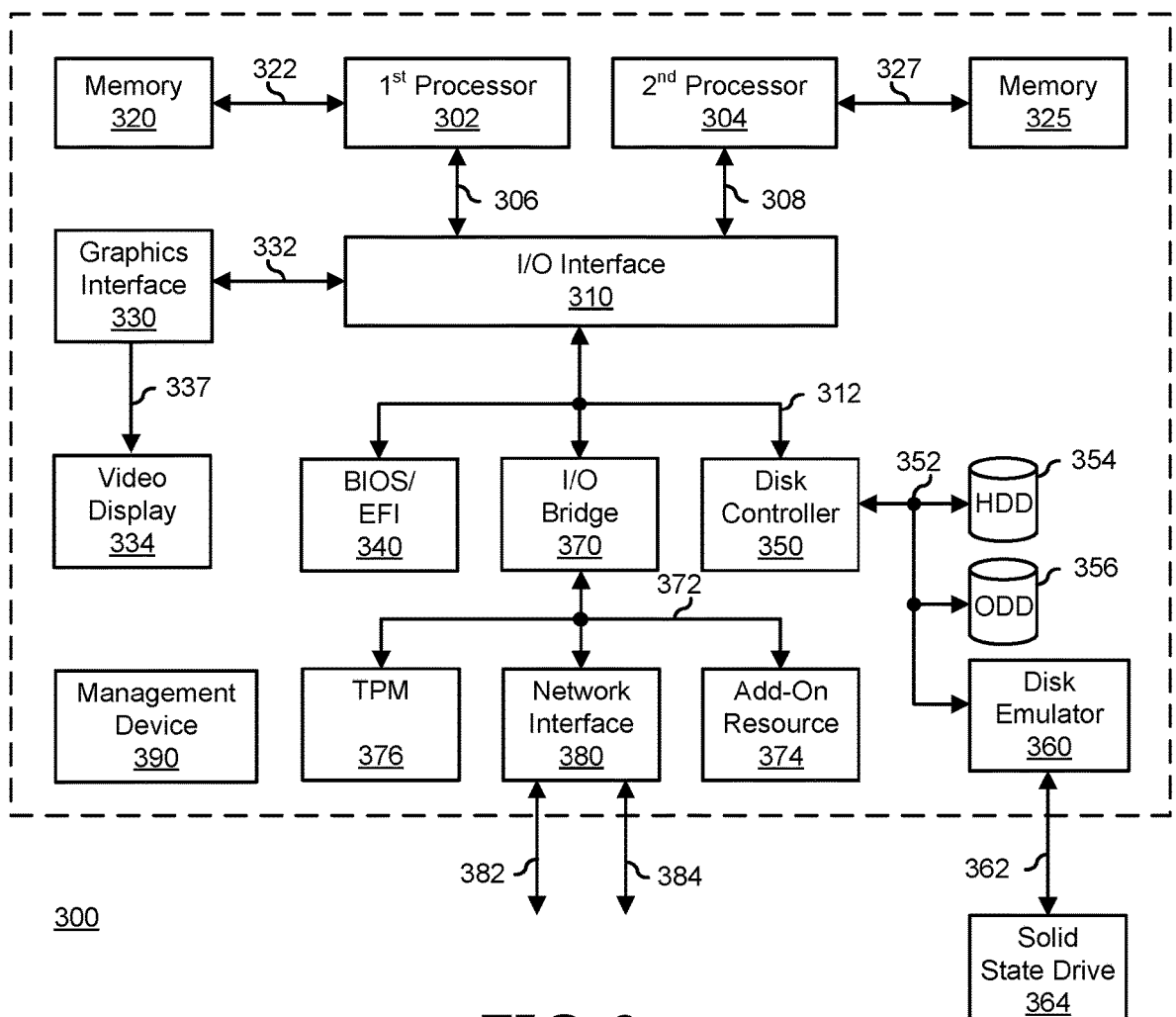
FIG. 3 is a block diagram illustrating a generalized information handling system according to another embodiment of the present disclosure.

FIG. 3 illustrates a generalized embodiment of an information handling system 300 similar to information handling systems 100 and 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. An information handling system, comprising:
   a processor;
   a baseboard management controller (BMC) configured, in response to an AC power cycle event, to:
      boot;
      provide a BMC ready signal in response to the boot;
      establish the BMC as a root of trust for the processor in response to providing the BMC ready signal; and
      provide a first processor boot indication to the processor in response to establishing the BMC as the root of trust, wherein the processor is configured to boot to an operating system in response to the first processor boot indication instead of in response to the AC power cycle; and
   a logic device configured to:
      determine that the BMC failed to provide the BMC ready signal;
      determine that the BMC failed to boot a first time in response to the AC power cycle, and further in response to determining that the BMC failed to provide the BMC ready signal; and provide a power-on reset signal to the BMC in response to determining that the BMC failed to boot the first time.

2. The information handling system of claim 1, wherein the logic device is further configured to:
set a watch dog timer prior to determining that the BMC failed to provide the BMC ready signal; and
determine that the watch dog timer has timed out in response to determining that the BMC failed to boot the first time, wherein providing the power-on reset signal is in further response to determining that the watch dog timer has timed out.

3. The information handling system of claim 2, wherein in determining that the BMC failed to boot the first time, the logic device is further configured to:
increment a BMC boot failure counter; and
determine that a value of the BMC boot failure counter is equal to 1.

4. The information handling system of claim 3, wherein the logic device is further configured to:
determine that the BMC failed to boot a second time in response to the AC power cycle, and further in response to determining that the BMC failed to provide the BMC ready signal; and
initiate a virtual AC power cycle event on the information handling system in response to determining that the BMC failed to boot the second time.

5. The information handling system of claim 4, wherein the logic device is further configured to:
determine that the watch dog timer has timed out in response to determining that the BMC failed to boot the second time, wherein initiating the virtual AC power cycle event is in further response to determining that the watch dog timer has timed out.

6. The information handling system of claim 5, wherein in determining that the BMC failed to boot the second time, the logic device is further configured to:
increment the BMC boot failure counter; and
determine that a value of the BMC boot failure counter is equal to 2.

7. The information handling system of claim 6, wherein: the logic device is further configured to:
determine that the BMC failed to boot a third time in response to the AC power cycle, and further in response to determining that the BMC failed to provide the BMC ready signal; and
provide a second processor boot indication to the processor in response determining that the BMC failed to boot the third time; and
wherein the processor is further configured to boot in a safe mode boot in response to the second processor boot indication, wherein the safe mode does not include booting to an operating system.

8. The information handling system of claim 7, wherein in determining that the BMC failed to boot the third time, the logic device is further configured to:
increment the BMC boot failure counter; and
determine that a value of the BMC boot failure counter is equal to 3.

9. The information handling system of claim 1, wherein, in response to booting the processor to the operating system, the logic device is further configured to:
determine that the BMC failed to provide the BMC ready signal; and
provide a core reset signal to the BMC in response to determining that the BMC failed to boot the first time, the core reset to reset a processor device of the BMC.

10. The information handling system of claim 9, wherein the logic device is further configured to:
set a watch dog timer prior to determining that the BMC failed to provide the BMC ready signal; and
determine that the watch dog timer has timed out in response prior to providing the core reset signal.

11. A method, comprising:
booting a baseboard management controller (BMC) of an information handling system;
providing, by the BMC, a ready signal in response to booting the BMC,
establishing, by the BMC, the BMC as a root of trust for a processor of the information handling system in response to providing the BMC ready signal;
providing a first processor boot indication to the processor in response to establishing the BMC as the root of trust;
booting the processor to boot to an operating system in response to the first processor boot indication instead of in response to the AC power cycle;
determining, by a logic device of the information handling system, that the BMC failed to provide the BMC ready signal;
determining, by the logic device, that the BMC failed to boot a first time in response to the AC power cycle, and further in response to determining that the BMC failed to provide the BMC ready signal; and
providing a power-on reset signal to the BMC in response to determining that the BMC failed to boot the first time.

12. The method of claim 11, further comprising:
setting a watch dog timer prior to determining that the BMC failed to provide the BMC ready signal; and
determining that the watch dog timer has timed out in response to determining that the BMC failed to boot the first time, wherein providing the power-on reset signal is in further response to determining that the watch dog timer has timed out.

13. The methods of claim 12, wherein in determining that the BMC failed to boot the first time, the method further comprises:
incrementing a BMC boot failure counter; and
determining that a value of the BMC boot failure counter is equal to 1.

14. The method of claim 13, further comprising:
determining that the BMC failed to boot a second time in response to the AC power cycle, and further in response to determining that the BMC failed to provide the BMC ready signal; and
initiating a virtual AC power cycle event on the information handling system in response to determining that the BMC failed to boot the second time.

15. The method of claim 14, further comprising:
determining that the watch dog timer has timed out in response to determining that the BMC failed to boot the second time, wherein initiating the virtual AC power cycle event is in further response to determining that the watch dog timer has timed out.

16. The method of claim 15, wherein in determining that the BMC failed to boot the second time, the method further comprises:
incrementing the BMC boot failure counter; and
determining that a value of the BMC boot failure counter is equal to 2.

17. The method of claim 16, further comprising:
determining that the BMC failed to boot a third time in response to the AC power cycle, and further in response to determining that the BMC failed to provide the BMC ready signal;
providing a second processor boot indication to the processor in response determining that the BMC failed to boot the third time; and
booting the processor in a safe mode boot in response to the second processor boot indication, wherein the safe mode does not include booting to an operating system.

18. The method of claim 17, wherein in determining that the BMC failed to boot the third time, the method further comprises:
incrementing the BMC boot failure counter; and
determining that a value of the BMC boot failure counter is equal to 3.

19. The method of claim 11, wherein, in response to booting the processor to the operating system, the method further comprises:
determining that the BMC failed to provide the BMC ready signal; and
providing a core reset signal to the BMC in response to determining that the BMC failed to boot the first time, the core reset to reset a processor device of the BMC.

20. An information handling system, comprising:
a power supply;
a baseboard management controller (BMC) configured, in response to an AC power cycle event from the power supply, to:
boot;
provide a BMC ready signal in response to the boot;
establish the BMC as a root of trust for a processor in response to providing the BMC ready signal; and
provide a first processor boot indication to the processor in response to establishing the BMC as the root of trust, wherein the processor is configured to boot to an operating system in response to the first processor boot indication instead of in response to the AC power cycle; and
a logic device configured to:
determine that the BMC failed to provide the BMC ready signal;
determine that the BMC failed to boot a first time in response to the AC power cycle, and further in response to determining that the BMC failed to provide the BMC ready signal; and
provide a power-on reset signal to the BMC in response to determining that the BMC failed to boot the first time.

* * * * *